United States Patent
Skogward

[19]

[11] Patent Number: 6,082,213
[45] Date of Patent: Jul. 4, 2000

[54] CONTROL DEVICE FOR THE TRANSMISSION OF A VEHICLE

[75] Inventor: Kenneth Skogward, Huskvarna, Sweden

[73] Assignee: Scandmec AB, Sweden

[21] Appl. No.: 08/973,639

[22] PCT Filed: Jun. 27, 1996

[86] PCT No.: PCT/SE96/00858

§ 371 Date: Apr. 29, 1998

§ 102(e) Date: Apr. 29, 1998

[87] PCT Pub. No.: WO97/01455

PCT Pub. Date: Jan. 16, 1997

[30] Foreign Application Priority Data

Jun. 27, 1995 [SE] Sweden .................................. 9502345
Mar. 5, 1996 [SE] Sweden .................................. 9600847

[51] Int. Cl.[7] ........................... F16H 59/02; B60K 20/02
[52] U.S. Cl. ..................................... 74/473.18; 74/473.12
[58] Field of Search .......................... 74/473.18, 471 R, 74/473.12, 473.15, 473.25, 473.26, 473.27, 337.5

[56] References Cited

U.S. PATENT DOCUMENTS

| | | | |
|---|---|---|---|
| 4,912,997 | 4/1990 | Malcolm et al. | 74/335 |
| 5,044,220 | 9/1991 | Raff et al. | |
| 5,062,314 | 11/1991 | Maier et al. | |
| 5,070,740 | 12/1991 | Giek et al. | 74/473 R |
| 5,140,866 | 8/1992 | Schetter et al. | 74/473 R |
| 5,339,705 | 8/1994 | Shirahama et al. | 74/475 |
| 5,768,944 | 6/1998 | Inuzuka et al. | 74/473 R |
| 5,799,539 | 9/1998 | Haase | 74/473.18 |
| 5,845,535 | 12/1998 | Wakabayashi et al. | 74/473.18 |
| 5,852,953 | 12/1998 | Ersoy | 74/473.12 |
| 5,862,708 | 1/1999 | Shamoto | 74/473.18 |

FOREIGN PATENT DOCUMENTS

465 688  10/1991  Sweden .

*Primary Examiner*—David M. Fenstermacher
*Attorney, Agent, or Firm*—Lerner, David, Littenberg, Krumholz & Mentlik, LLP

[57] ABSTRACT

Control device includes a control lever and a control bracket provided with a first pivotable hinge by which the lever is pivotally arranged in relation to the control bracket for displacement between a plurality of control positions. The control positions of the control lever about the pivotable hinge are converted into corresponding operating conditions of a device which is intended to be operated. In this regard, the control lever is adjustable to assume a second control movement. The control lever is caused to perform its control movement by pivoting of the lever with a second pivotable hinge operating as a pivot center. The control device includes a locking device which, during adjustment to the second control movement, locks the pivoting motion of the control lever about its first pivotable hinge. In this manner, the pivot center can be relocated to the second pivotable hinge.

9 Claims, 9 Drawing Sheets

CONTROL DEVICE FOR THE TRANSMISSION OF A VEHICLE

TECHNICAL FIELD

The present invention relates in general to a control device for the transmission of a vehicle, and more particularly, allowing for automatic and manual modes of operation.

BACKGROUND OF THE INVENTION

The gear lever assembly is a very common application of control devices of the present type for manual and automatic gearboxes. An example of a gear lever assembly allowing both automatic and manual gear-shifting can be found for example in U.S. Pat. No. 5,062,314. This document discloses a gear lever which can be moved about a transverse main axis, for displacement between different operational conditions in an automatic gear-shifting mode. The gear lever can also be moved about a second axis, which is transverse to the main axis, for changing between the automatic gear-shifting mode and a manual gear-shifting mode. Due to the fact that the second axis of rotation is supported on a hub on the first axis, any clearances in the various components will be added and will be enlarged at the gear lever knob. This may impart a feeling of lack of stability and uncertainty as to whether the correct gear position is engaged.

SUMMARY OF THE INVENTION

The object of the invention is to provide a simple and highly stable assembly which provides distinct gear positions and which may accommodate high forces.

In one embodiment of the present invention there is described a control device comprising a control lever, a control bracket having a guide track, the control lever having a first pivotable hinge wherein the control lever is pivotally arranged in relationship to the control bracket for displacement between a plurality of control positions with a first control movement, wherein the control positions of the control lever about the first pivotable hinge are adapted to be transferred into corresponding operating conditions, the control lever further adapted to carry out a second control movement by turning the control lever about a second pivotable hinge forming a pivot center, a locking device which during displacement of the control lever to the second control movement locks the pivotable movement of the control lever about the first pivot hinge and changes the pivot center for the control lever to the second pivotable hinge, the second pivotable hinge including a transverse shaft which is translationally moveable in the guide track for determining the control movement of the control lever and for locking the translational displacement of the shaft in a predetermined control condition whereby the change of the pivot center for the control lever is carried out, the control bracket including a housing having two wall sections extending on each side of the control lever and having the guide track in each wall section, and a mechanical transmission element for the transfer of at least one operating condition operatively coupled to the control lever.

The present invention further includes a bearing ball at the end of the control lever, and a bearing cup arranged in the control bracket to form part of the first pivotable hinge, the bearing cup allowing the displacement of the control lever to the second control movement about the second pivotable hinge by means of positionally guiding the movement of the bearing ball within the bearing cup.

The present invention further includes that the bearing cup is in the form of tracks which allow both a rotational movement and a translational displacement of the bearing ball.

The present invention further includes that the tracks for the bearing ball comprise a first section for rotational movement of the bearing ball in a predetermined position for pivoting of the control lever about the first pivotable hinge, for translational displacement to a second section which presents an angle in relationship to the first section, and for translational displacement of the bearing ball along the second section for pivoting the control lever about the second pivotable hinge.

The present invention further includes two electrical switches for detection of at least four positions of the control lever.

The present invention further includes that the electrical switches are each adapted to maintain one electrical circuit broken with the bearing ball being in its position for rotational displacement in the first section, and to maintain both electrical circuits closed, alternatively maintaining one of the electrical circuits closed, with the bearing ball being in any one of three positions in the second section.

The present invention further includes that the tracks for the bearing ball are generally T-shaped.

The present invention further includes that during the second control movement, the control lever is adapted to be displaced along a path which extends in a direction which is separated from a direction which is parallel to a path of the first control movement.

The present invention further includes that an angle between the two paths is in the interval of about 30°–45°.

BRIEF DESCRIPTION OF THE DRAWINGS

The invention will be described in greater detail in the following with reference to an embodiment and to the annexed drawings, in which.

DETAILED DESCRIPTION OF THE PREFERRED EMBODIMENTS

Figure 1:
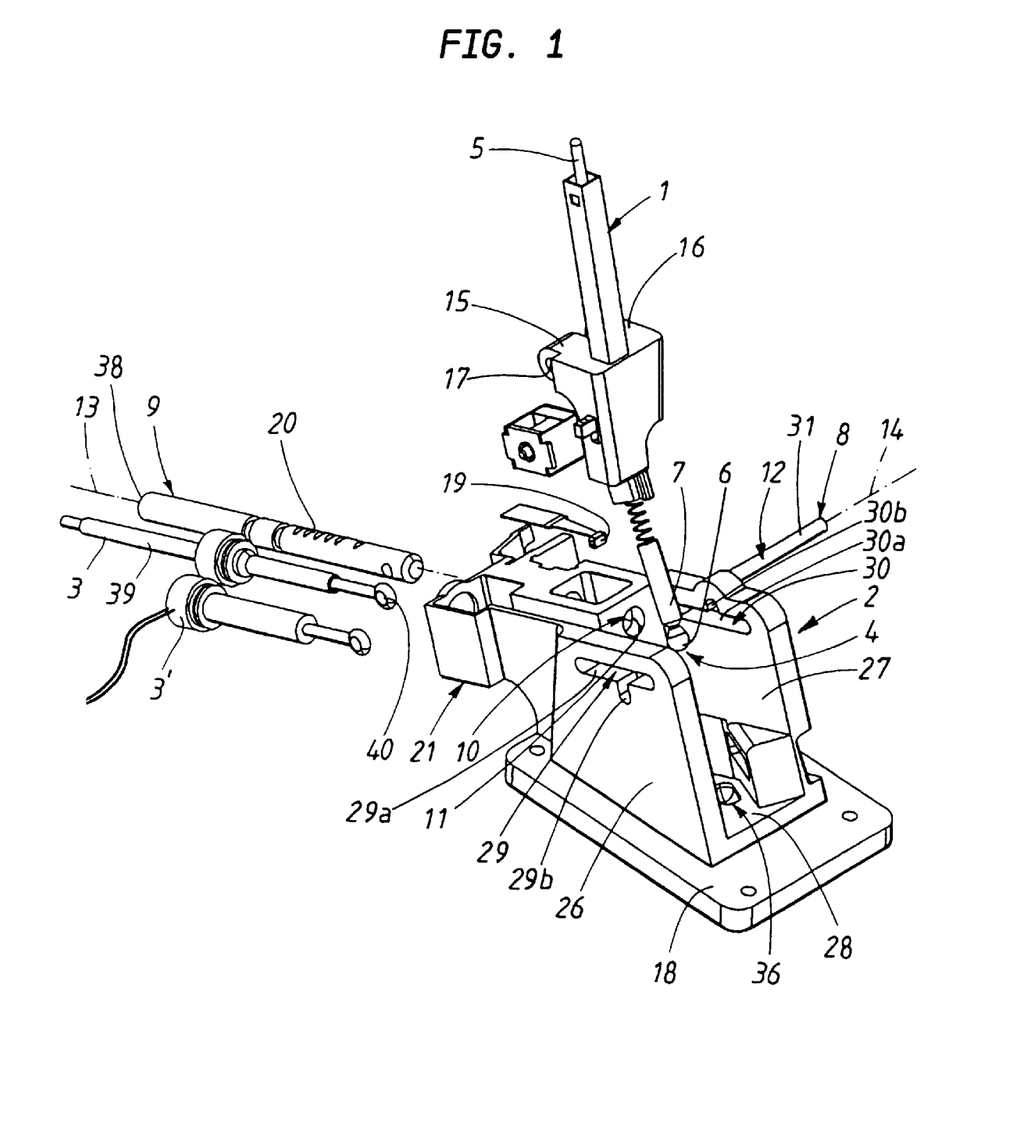
FIG. 1 is an exploded view showing a control device according to the invention, in the form of a gear selector lever which can be moved between two modes of gear shifting.
Figure 2:
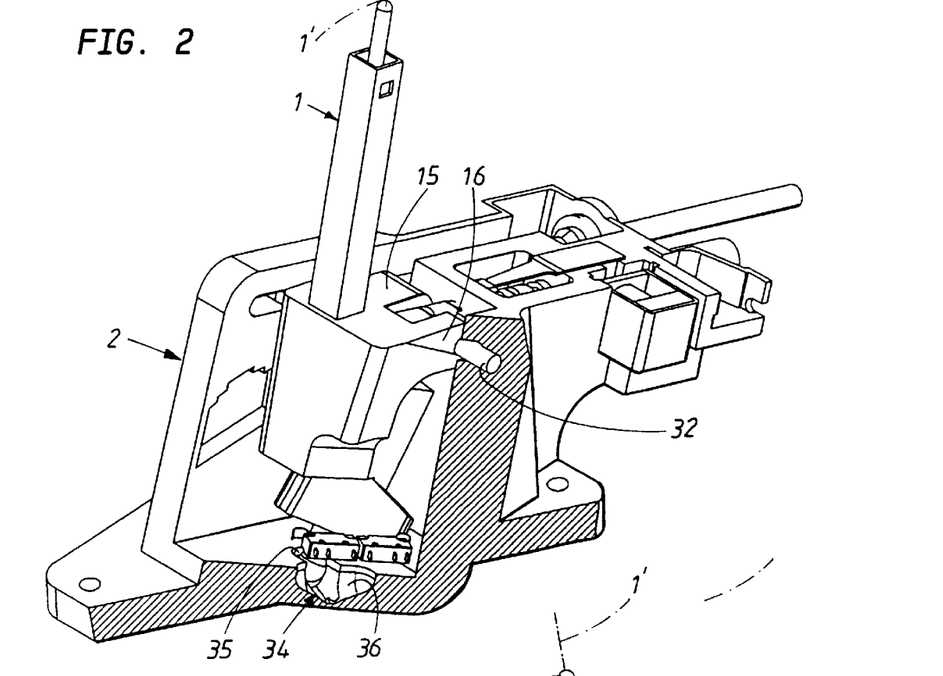
FIG. 2 shows a partially broken perspective view of the control device according to the invention with an associated control lever in a position corresponding to a first type of transmission.
Figure 3:
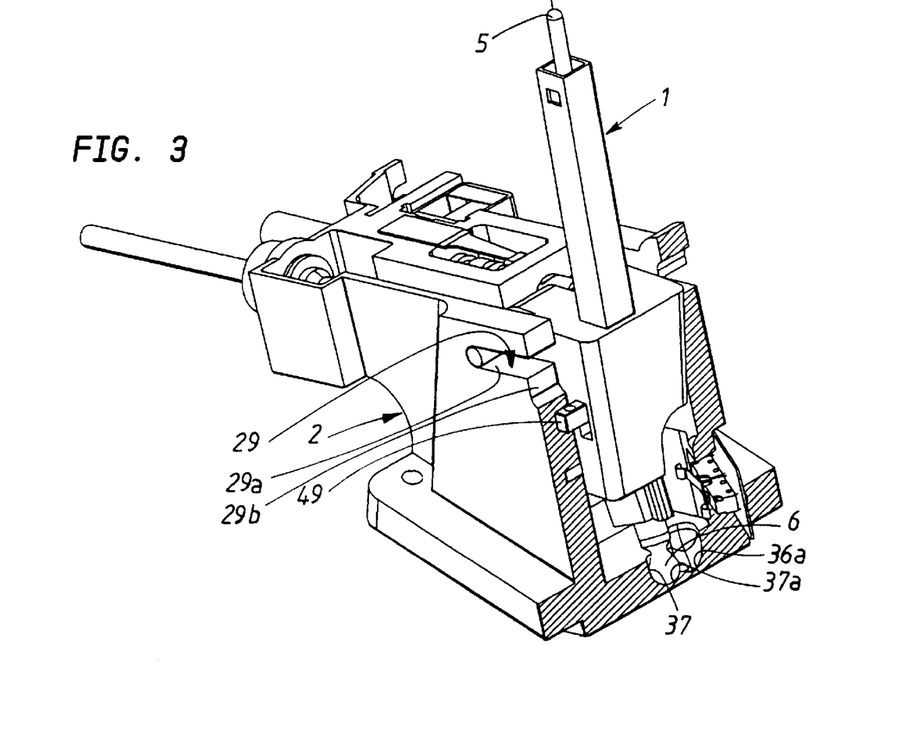
FIG. 3 shows a partially broken perspective view of the control device according to the invention with an associated control lever in a position corresponding to a first type of transmission.

As is apparent from, for example FIGS. 1, 2 and 3, the control device includes two main parts, i.e. a control lever 1 having a longitudinal axis 1' and a control bracket 2. The control lever is pivotally arranged in relation to the control bracket so as to provide different pivoting movements between different control positions. In the example as shown, the control device is in the nature of a gear lever assembly for an automatic transmission for motor vehicles, which lever assembly can be moved between two modes, or types, of gear-shifting, i.e. the conventional automatic gear-shifting mode and a particular gear-shifting mode in which the changing of gears is entirely controlled by the driver, as is the case with a manual gearbox. The control lever 1 is normally movable in its main movement by pivoting it in a first pivoting plane extending essentially vertically in the longitudinal direction of the vehicle. This pivoting displacement direction of the control lever is, for example, intended to be converted to a translational displacement of a transmission element, for example, a cable 3. The cable is connected to the device which is to be controlled by means of the control device, i.e., the automatic gearbox in the present embodiment. The above-mentioned pivoting displacement of the control lever is carried out about a first pivotable hinge 4 which is arranged at a distance from the upper end 5 of the control lever, at which point the lever is intended to be gripped by the driver during manual operation. Normally, the lever includes a knob (not shown) or a control head which provides a grip which is adapted to the operator's hand. The pivotable hinge will be described in greater detail below and is, in one embodiment, constructed as a rounded section or a pivot ball 6 at the lower end 7 of the control lever. The pivot ball is supported in a bearing socket in the control bracket 2. In one embodiment, the bearing socket is in the nature of a bearing cup in which the ball can be pivoted. The bearing socket will be described in greater detail below.

According to the invention, the control lever 1 is pivotally connected via a second pivotable hinge 8 to an elongated guide element 9, which together with a bearing part 10 in the control bracket, form a guide device for at least the first displacement of the control lever 1, i.e. the pivoting forwards/backwards displacement about the pivotable hinge 4 of the lever. The guide element 9, together with the bearing part 10, is operative so that it can perform a reciprocal translational displacement which in the example is entirely linear and synchronous with the first pivoting displacement of the control lever about its first, lower pivotable hinge 4 and along its first pivoting plane.

In the example, the guide element 9 is constructed as an essentially cylindrical unit which forms a main axis and which, by means of its essentially cylinder mantle-shaped sliding surface, is supported by a bearing surface 11 of the bearing part 10, which surface is formed in essentially a corresponding manner and is formed by a recess or a cylindrical bore in the control bracket 2.

The second pivotable hinge 8 is arranged at a distance from the first pivotable hinge 4 and the upper end 5 of the control lever. In the example, the second pivotable hinge 8 is provided with a transverse shaft 12 which is inserted through the guide element 9, i.e. the main axis, preferably its geometrical longitudinal axis, and directed with its own geometrical axis 14 perpendicularly in relation to the longitudinal axis of the guide element 9. FIG. 1 shows in greater detail an example of the actual design of the pivotable hinge 8 with two protruding flanges 15, 16 on the control lever 1. Each of the flanges 15, 16 presents a coaxial hole 17 through which the transverse shaft 12 extends. The holes 17 are dimensioned so as to form a bearing for the shaft extending through the holes and to allow a pivoting displacement of the control lever 1 about the geometrical transverse axis 14 of rotation. The guide element 9 performs a reciprocal displacement along its geometrical longitudinal axis 13. Since the guide element 9 is supported in the control bracket, the lower pivotable hinge 4 is normally operative to carry out a minor lifting and lowering displacement in relation to the control bracket or the control lever 1, or a combination of both movements. An advantageous solution will be described in greater detail below.

The control bracket 1 is designed with a section 18, see FIG. 1, with downwardly facing mounting surfaces for the attachment of the bracket on a vehicle body, for example, by means of fastening screws (not shown) which are inserted through holes in the bracket. The control bracket is relatively sturdy so as to enclose the guide device 9, 10 and other functional elements which either sense the position of the guide element 9 or may position or lock the guide element in a predetermined translational position. These functions may, for example, include functions which are known per se, for example the shiftlock and keylock functions. The shiftlock functions are in the nature of a locking function which locks the control lever 1 in certain positions, for example the parking and neutral positions, when the foot brake is not applied. For example, the shiftlock function is designed as a locking element which may be formed by a pin or a plate which, in its locking position, is inserted into a recess, for example an annular track in the guide element 9. The locking element is suitably positioned by means of a solenoid, which is not shown in the example. The keylock function can be provided by means of a locking unit having a locking element which is positioned by means of a wire between a locking position for locking of the guide element and for releasing the guide element, respectively. For this purpose, an annular track is, for example, arranged in the mantle surface of the guide element.

Other functions which may be incorporated in the guide element 9 include a positioning device 19 which provides distinct gear positions for the normal automatic gear-shifting mode of the control device. In accordance with one embodiment, this positioning device can be formed by a spring-loaded arm which is spring-biased towards the peripheral wall of the guide element and cooperates with recesses 20 in the guide element. These recesses are chosen in a number which corresponds to the number of gear positions in the automatic gear-shifting mode. The number of gear positions may vary to a great degree, but is normally at least four and is in the illustrated embodiment six. The positioning device can be combined with electrical detectors so as to provide an optical indication of the gear positions. For example, the current gear position may be indicated on the dashboard. In a corresponding manner, a mechanical indication can be obtained as a result of a detection of the axial position of the guide element 9.

Furthermore, the control bracket 2 is designed as a housing having two wall sections 26, 27 protruding from a front section 21, the wall sections extending on each side of the control lever 1, and having a base section 28 extending between the wall sections. The base section supports, directly or indirectly, the first, lower pivotable hinge 4.

Each of the two side wall sections 26, 27 presents a guide track 29, 30 which extends with a track section 29a, 30a, extending straight and parallel to the longitudinal axis 13 of the guide element 9, and with a track section 29b downwardly facing on one side in the wall section 26, and also a track section 30b which is upwardly facing on the other side. The guide tracks provide guiding for the transverse shaft 12 which presents shaft sections 31 and 32, respectively. In this manner, the gear lever 1 is stabilized as regards the pivoting forwards/backwards movement, i.e. in the direction corresponding to the manner in which the driver is seated or the longitudinal direction of the vehicle By means of the transverse track sections 29b, 30b, the lever is also allowed to carry out a sidewards, pivoting displacement and to be locked against a pivoting forwards/backwards movement. This will be described in greater detail below.

The control device is directed to the type of gear lever assemblies which can be moved between two gear-shifting modes. Except from the above-mentioned conventional, automatic gear-shifting mode, the device can be set in an alternative gear-shifting mode, which in the example described more resembles gear changing with a manual gearbox, since the driver is in complete control of the gear positions of the gearbox. In the automatic gear-shifting mode, the control lever 1 is pivoted as has been described above with the first, lower pivotable hinge 4 as a pivot center for the control lever. After moving the control lever a limited angle by turning the lever about the longitudinal axis 13 of the guide device, the pivot center of the lever 1 is changed up to the second pivotable hinge 8. The changing displacement of the control device 1 is made possible due to the fact that the guide element 9 is not only adapted to perform a translational displacement in its longitudinal direction but is also adapted to perform a pivoting displacement along its longitudinal axis 13 (alternatively that the lever 1 only can be pivoted about the axis 13), due to the fact that the lower end 7 of the lever can be moved sidewards and due to the fact that the transverse shaft 12 is allowed to be pivoted in a plane which is perpendicular to the axis 13. A change to the alternative gear-shifting mode is allowed in a certain pivoting position for the control lever 1, that is the position in which the transverse shaft 12 is situated right in front of the transverse track sections 29b, 30b and can be inserted into these sections.

Figure 4:
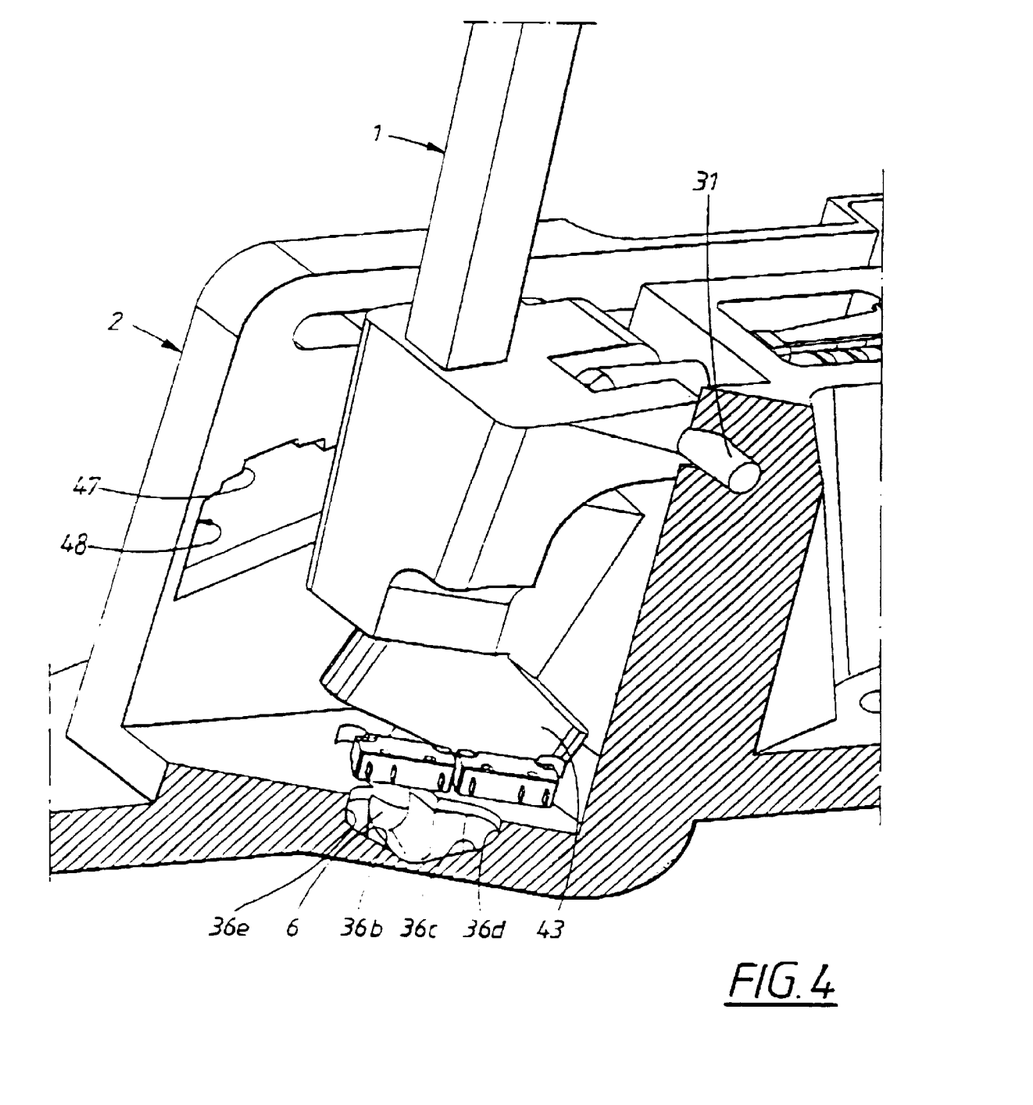
FIGS. 4–8 show, on a larger scale, partly broken perspective views of the control device in different operating positions for the two types of gear-shifting.

The above-described sidewards displacement of the control lever is made possible as a result of the design of the lower pivotable hinge 4. For example, FIGS. 2–4 show an example of one design of the pivotable hinge 4. A bearing cup 34 is arranged in the base section 28 of the control bracket 2. The cup is essentially designed as a T with a transverse section 35 extending parallel to the general longitudinal direction 14 of the transverse axis in the automatic gear-shifting mode, and with a section 36 extending with an angle, for example approximately 30°, to the longitudinal direction of the longitudinal axis 13 of the main axis. The transverse section 35 presents a bowl-shaped recess 37a in connection with its end 37. The longitudinal section 36 is also recessed, presenting a bowl-shaped section 36a in the mid section and inclined paths on each side. The paths resemble legs 36b, 36c arranged at an angle when seen along a cross-sectional view, see for example FIG. 4. In this manner, the hinge ball 6 is urged to engage one of the bowl-shaped sections. In the automatic gear-shifting mode, the hinge ball 6 is held in the bowl-shaped section 37a, which provides a defined bearing point and forms the lower bearing socket for the lever 1, whereas in the alternative gear-shifting mode the control lever urges to assume a neutral position in the bowl-shaped section 36a due to the spring-biased pivot ball 6 cooperating with the bearing bowl. The ball 6 may slide between end positions towards a stop element 36d, 36e along the inclined angled sections 36b, 36c, since the ball 6 is arranged on a bar which is arranged in the lever in a movable and spring-biased manner.

In the automatic gear-shifting mode, the control lever is pivoted about its lower pivotable hinge 4. In this regard, the lever can be moved forwards/backwards in its first pivoting plane which extends essentially vertically through the longitudinal axis 1 of the control lever 1 and the lower pivoting point, i.e. the bearing element. The guide element 9 provides a linear guiding which, due to its hinged connection via the upper, second hinge element 8 provides a stable pivoting displacement about the lower hinge element 4. This displacement in the vertical plane is fixed and is possible due to the guiding of the transverse shaft 12 in the tracks 29, 30, since the transverse axis during this displacement runs in the longitudinal, horizontal track sections 29a, 30a between the ends of the track sections. Due to the pivoting displacement of the lever 1 about the lower pivotable element 4, the control positions of the automatic gearbox can be set. For example, this may be carried out in a mechanical manner by transforming the pivoting displacement of the control lever to a reciprocal translational displacement of the transmission element 3. This element can either be mounted in the end 38 of the guide element 9 facing away from the control lever or may extend through a central axial bore in the guide element 9 and is fixed either in the transverse shaft 12 or in the control lever. Alternatively, the transmission element 3 may extend in connection with the guide element, on the outside thereof, so as to be attached directly to the control lever 1 or to the shaft 12, as is the case in the embodiment according to FIG. 1. One aspect of the invention is that the transmission element 3, in its section which is adjacent to the control device, has essentially the same longitudinal direction as the guide element 9 and extends in close connection thereto. In this manner, the displacement for positioning the control lever in the alternative gear-shifting mode will not imply any sidewards displacement of the transmission element and of the cable covering 39 comprising a fastening end 40 and being associated with the cable, which end is mounted in a suitable manner in any fixed section of the control device.

The change from the automatic gear-shifting mode to the alternative mode is made through sidewards pivoting of the control lever 1 through a small angle in relation to the main axis 13. Due to the fact that the guide element 9 in the disclosed embodiment is not solely supported in a linear manner but is also pivotably arranged in the control bracket 2 for pivoting about its geometrical axis 13, the guide element also forms a pivot bearing for the lever. This sidewards movement is possible in a certain gear position of the lever, suitably the normal driving position. This is determined by the arrangement of the transverse track sections 29b, 30b of the guide tracks 29, 30, which sections enable both the movement of the transverse axis about the axis 13 and also locks the pivoting of the lever about the lower pivotable hinge 4.

Figure 5:
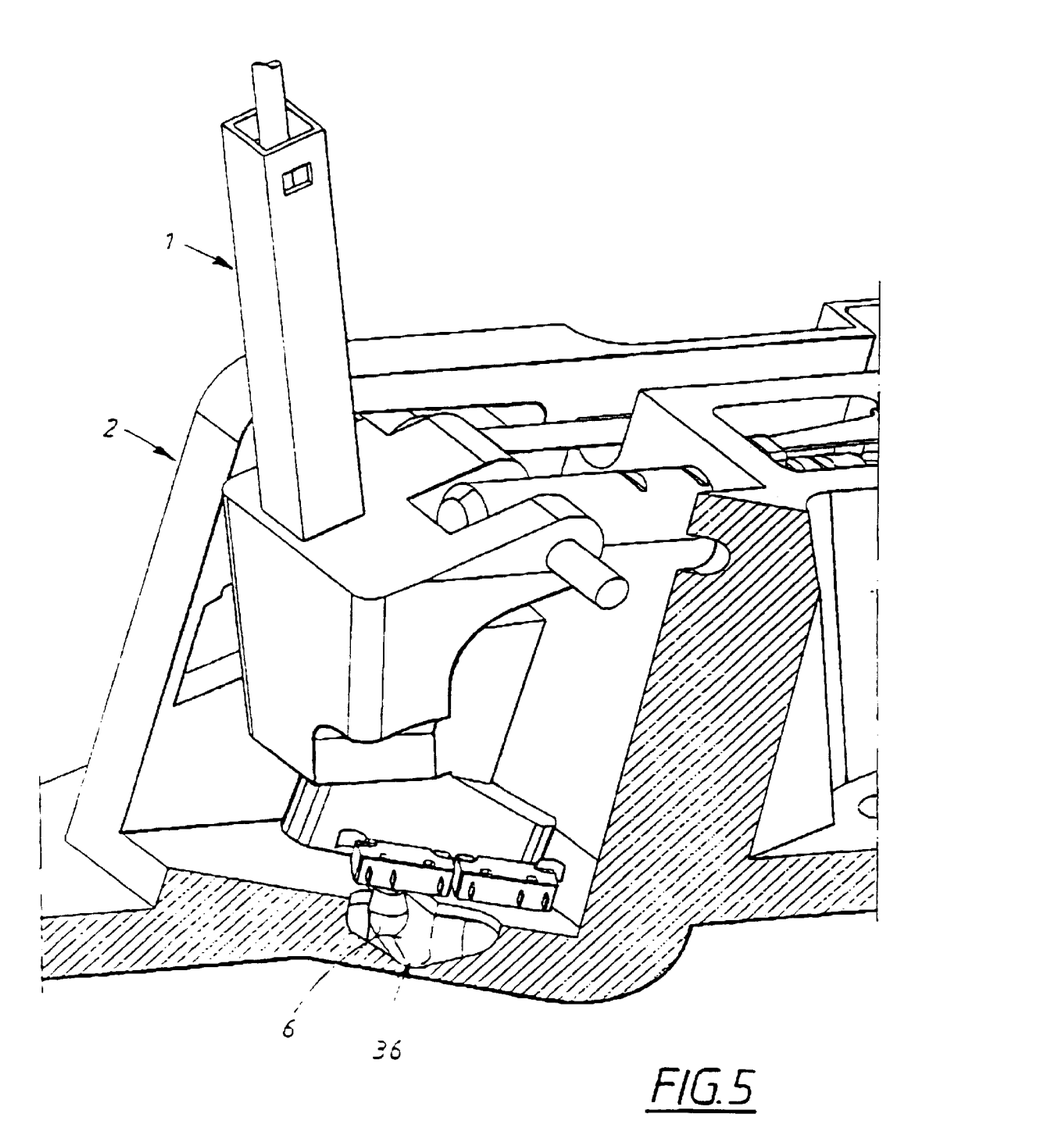
Figure 6:
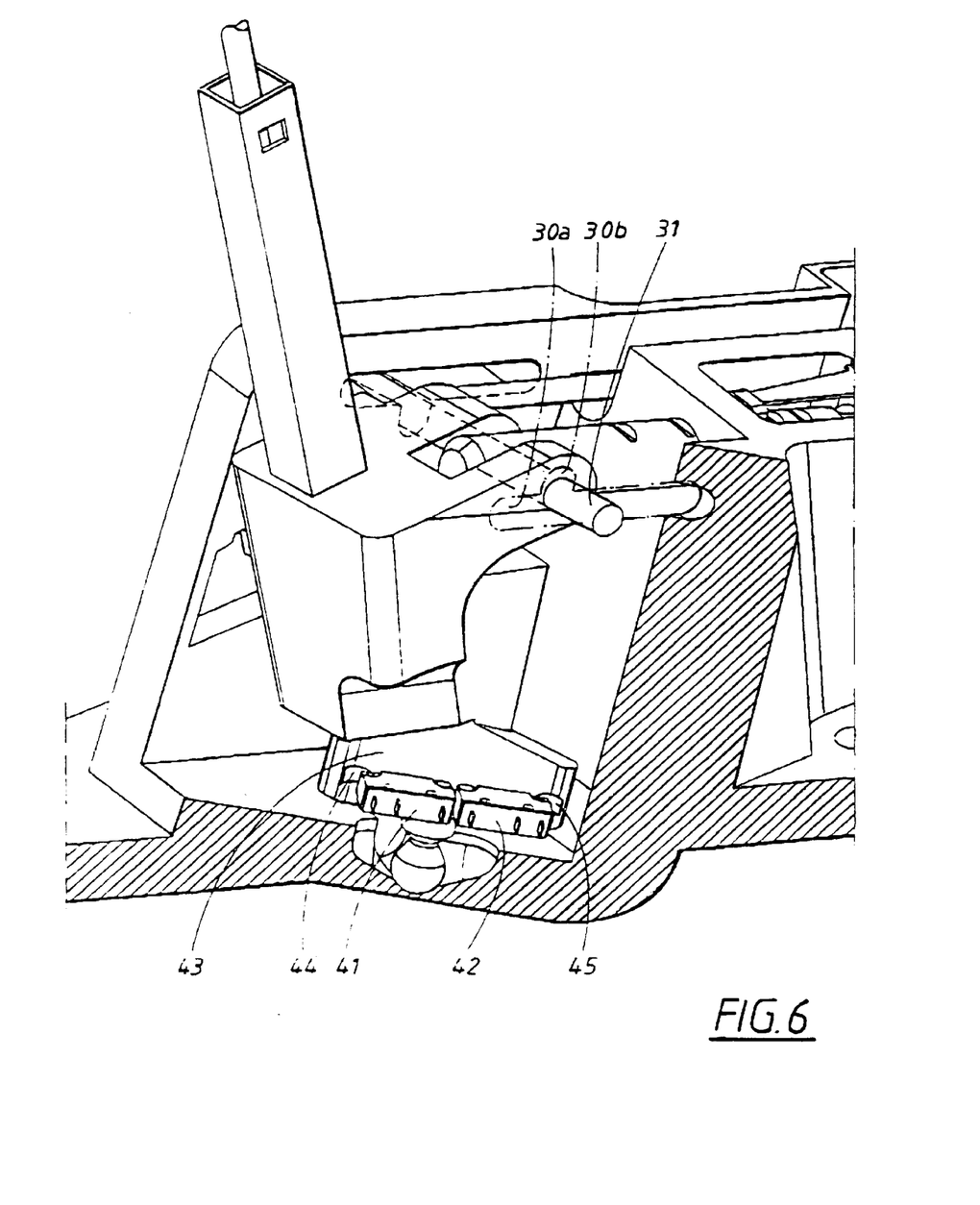

The bearing cup 34, or more precisely the transverse section 35, see FIGS. 5 and 6, forms a guiding path for the pivotable ball 6 which, during the sidewards displacement of the lever, runs from its bowl-shaped section 37a along a protrusion 35a to the bowl-shaped section 36a of the section 36. The protrusion 35a provides resistance against movement of the lever which must be overcome by means of a certain force. This reduces unintentional gear-changing movements.

Due to the sidewards displacement, the lever 1 changes its pivoting point from the lower pivotable element 4 to the upper pivotable element 8, or more precisely about the geometrical axis 13 of the transverse shaft 12. Thus, the lever 1 is also allowed to move in a second pivoting plane which is arranged at a minor angle in relation to the first pivoting plane.

In an alternative gear-shifting mode, the control lever 1 is adapted to swing about the upper pivotable hinge 8 between a neutral position, which for example corresponds to the current gear engagement when the gear lever was moved from the driving position D to the alternative gear-shifting mode.

The bowl section 36 may be designed with a radius which is less than the hinge ball 6. In this manner, an edge is formed which faces both displacement directions. In this manner, a resistance against movement is provided, which must be overcome by means of a certain force before leaving the neutral position by means of swinging movements in the plane of the paper.

As opposed to the automatic gear-shifting mode in which the automatic gearbox in the conventional manner changes gear in the D position automatically depending on, for example the engine speed, the alternative gear-shifting mode is thus based on the fact that the driver chooses the gear manually. When the driver, by gripping the control lever, moves it forwardly in the alternative gear-shifting mode, the automatic gearbox is changed up one gear for each swinging movement from the neutral position. In a corresponding manner, the gearbox is changed down one gear for each displacement of the gear lever in the backwards direction. As is shown in the drawings, the activation of the automatic gearbox in the alternative gear-shifting mode is carried out electrically by means of two microswitches 41, 42 which are provided with sensors 44, 45 situated in front of a guide surface 43 at the lower part of the control lever. In this manner, the microswitches may, in cooperation with the end section of the lever, alternately close and break electrical circuits so as to readjust the gearbox in a manner which is known per se via electromechanical control devices on the gearbox, for example solenoids. This will be described in greater detail below.

In the embodiments shown, a locking device 48 in the form of a recess is provided. This device is provided with locking edges 47, is profiled and is fixed to the control bracket 2. The recess cooperates with a locking element 49 which is movable and arranged in the lever 1. The locking element is spring-biased in the longitudinal direction of the lever and is urged towards the fixed locking element. The moveable locking element 49 can be activated manually by means of a button 50 in the upper end of the lever. Due to the profiled shaped, the lever is locked for not being unintentionally changed from certain gear positions to other gear positions, for example from the neutral position to the reverse position.

Figure 9:
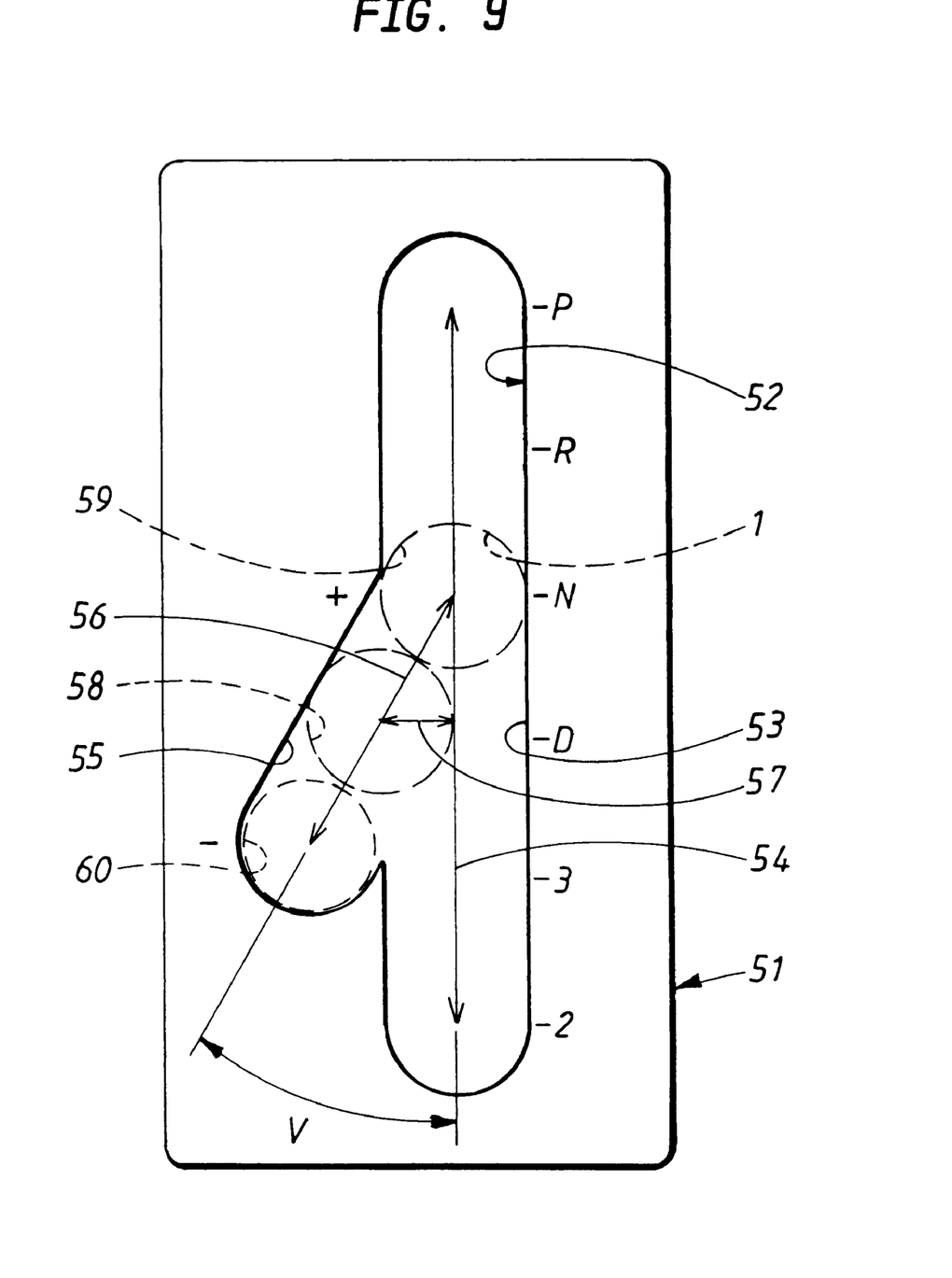
FIG. 9 shows in a schematical manner a control panel forming part of the control device.

FIG. 9 shows a control panel 51 which is intended to form part of a cover bracket which covers the control bracket 2. The control panel 51 presents a track 52 through which the control lever 1 is intended to extend into the driver's compartment within reach of the driver. The track 52 has a design which is operative to provide the various displacements of the control lever. The track presents a straight main track 53. The lever is intended to be moved along the main track in a main path 54 in one of the gear-shifting modes of the control device, i.e. the automatic gear-shifting mode for selection between different gear positions, which are usually called PRND, and further gear positions which according to the shown example are denoted 3 and 2, respectively. P denotes the park position, R the reverse position, N the neutral position and D the drive position during automatic changing between the different gears of the gearbox, for example four. 3 denotes locking of the gearbox in third gear, whereas 2 denotes the second gear. The second gear-shifting mode of the control device follows a side track 55 which directly joins the main track 53 and is directed with such an angle that the displacement path 56 of the side track presents a clear angle in relation to the displacement path 54 of the main track. This angle v is preferably in the interval 30–45° and implies that the displacement path 56 generally maintains a direction from the driver's position towards the main track somewhere between its end points, essentially its middle section, since the displacement path of the main track is directed in the longitudinal direction of the vehicle and the control lever normally is positioned slightly in front of the driver.

In the example, a change between the automatic gear-shifting mode and the particular gear-shifting mode is carried out in the driving position D. In this regard, the lever is moved transversely in relation to the main displacement path 54 along a short displacement path 57 to the neutral position for the alternative gear-shifting mode, wherein the lever assumes the neutral position shown with a broken circular line 58. In the alternative gear-shifting mode, the swinging between the + position is carried out. In the example, the + position may coincide for the control lever with the neutral N position of the normal gear-shifting mode and is denoted with a circular line 59. A swinging movement towards the driver along the path 56 of movement to the position is illustrated by means of a third circular line 60 in FIG. 9. The normal gear-shifting mode is resumed from the neutral position 58 of the alternative gear-shifting mode and is carried out along the displacement path 57 to the driving position D.

Figure 10A:
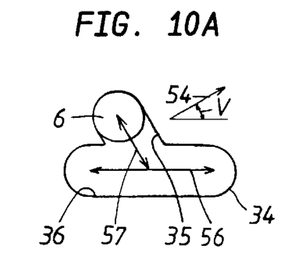
FIGS. 10A–10C show two switches forming part of the control device.
Figure 10B:
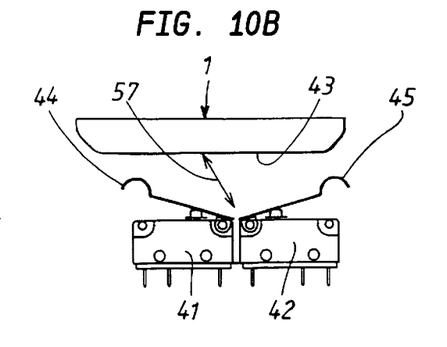
Figure 10C:
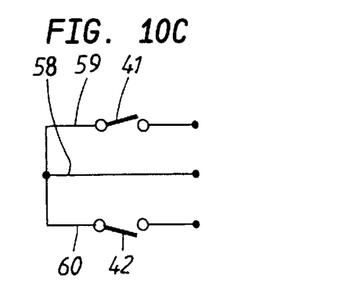

FIGS. 10–13 show the four different conditions of the lower pivotable hinge and also the corresponding conditions of the microswitches 41, 42 and the associated circuit design. The main shape of the hinge cup 34 and its orientation is also shown. The transverse track section 35 is thus transverse to the direction of the main displacement path 54, which forms the angle v in relation to the track section 36. By using the conditions of the two switches 41, 42 for each position of the lower end of the control lever, i.e. the pivotable ball 6, a truth table can be used for reading four different control conditions through the use of two switches only. In this regard, FIG. 10 shows the position of the automatic gear-shifting mode with the pivotable ball 6 as a fixed pivot point. In this regard, the lower end of the control lever 1 and thus also the guiding surface 43 is kept at a distance from the microswitches 41, 42 which are both kept open. The microswitches form part of a three-wire current circuit having a continuously closed center-conductor circuit 58 and two control circuits 59, 60 in which each microswitch 41, 42 is included. The position according to FIG. 10 corresponds to the position of the hinge ball 6 shown in FIGS. 2–5.

Figure 11A:
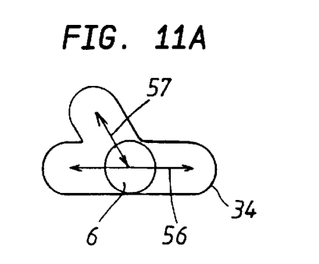
FIGS. 11A–11C show two switches forming part of the control device and assuming a different operating position.
Figure 11B:
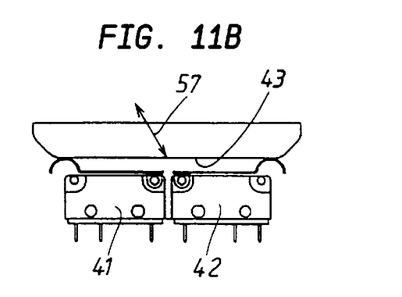
Figure 11C:
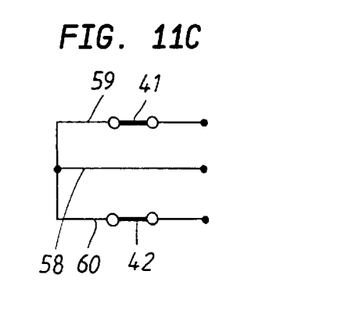

In FIG. 11, as well as in FIGS. 6 and 9, the control device is moved along the movement path 57 to the alternative gear-shifting mode, the hinge ball 6 having been moved to the neutral position and the lower end of the control lever having been moved to the two switches 41 and 42, which are set in a closed condition in which the two circuits 59, 60 are closed.

Figure 8:
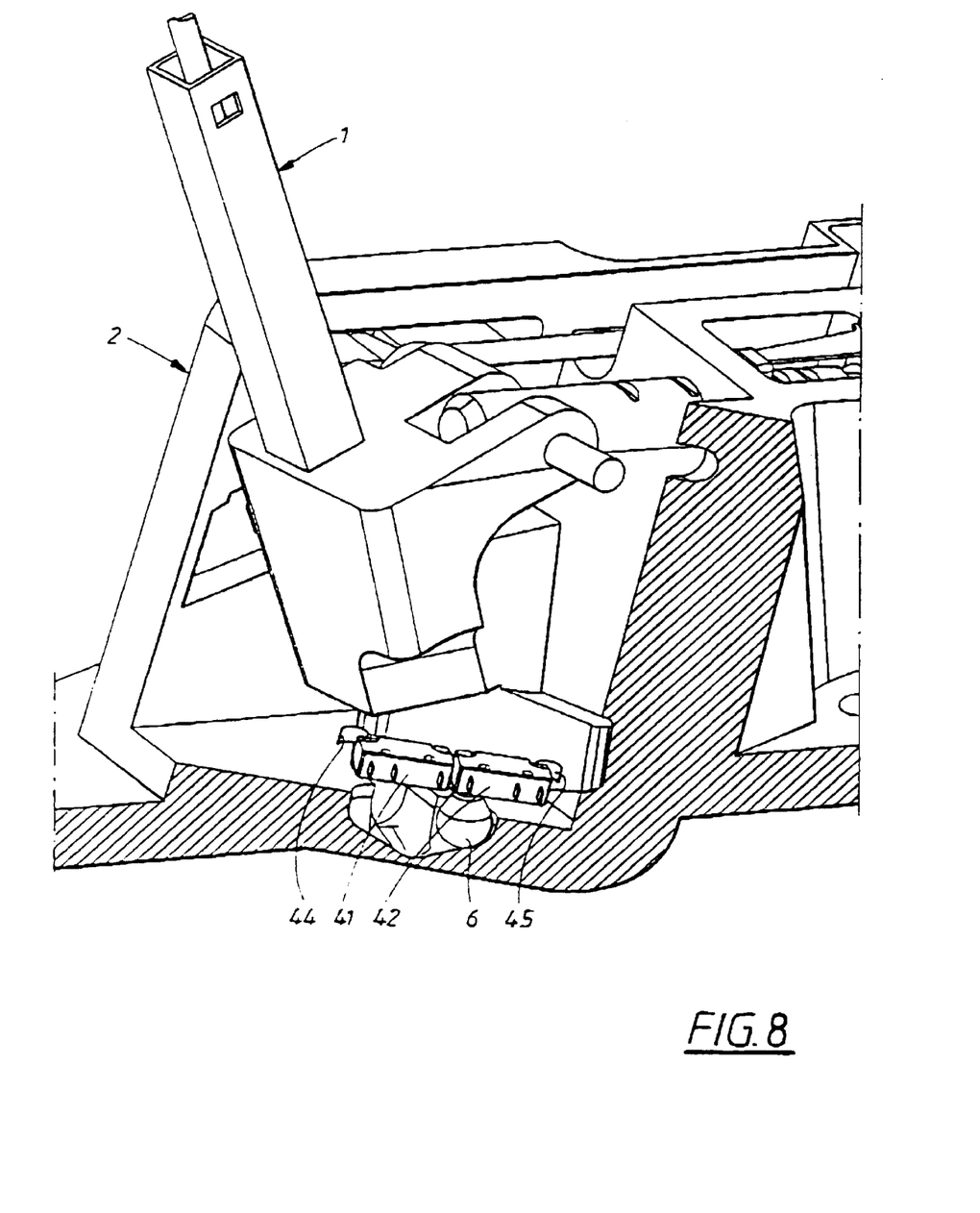
Figures 12A, 12B:
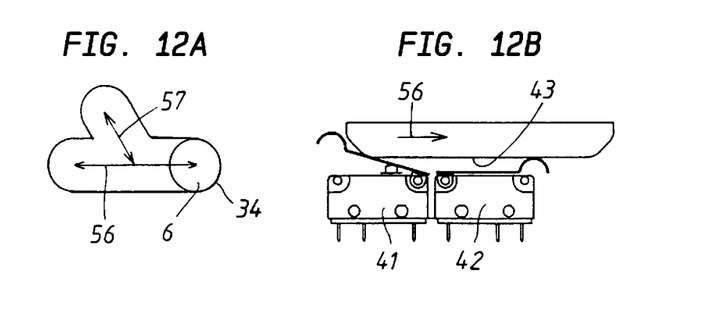
FIGS. 12A–12C show two switches forming part of the control device and assuming a different operating position.
Figure 12C:
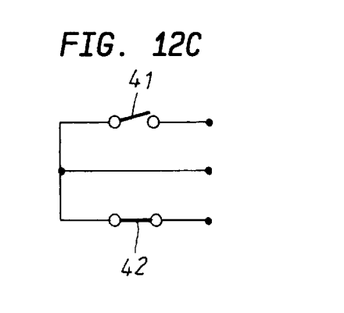

FIG. 12, as well as FIGS. 8 and 9, show the hinge ball 6 and the lower end of the lever being set along the direction of the arrow 56 in a position corresponding to the—position, i.e., a position corresponding to changing down. In this manner, the guiding surface 43 is displace in its longitudinal direction and through its limitation in this direction keeps the microswitch 41 open, whereas the switch 42 is closed. This position is also shown in FIG. 8.

Figure 7:
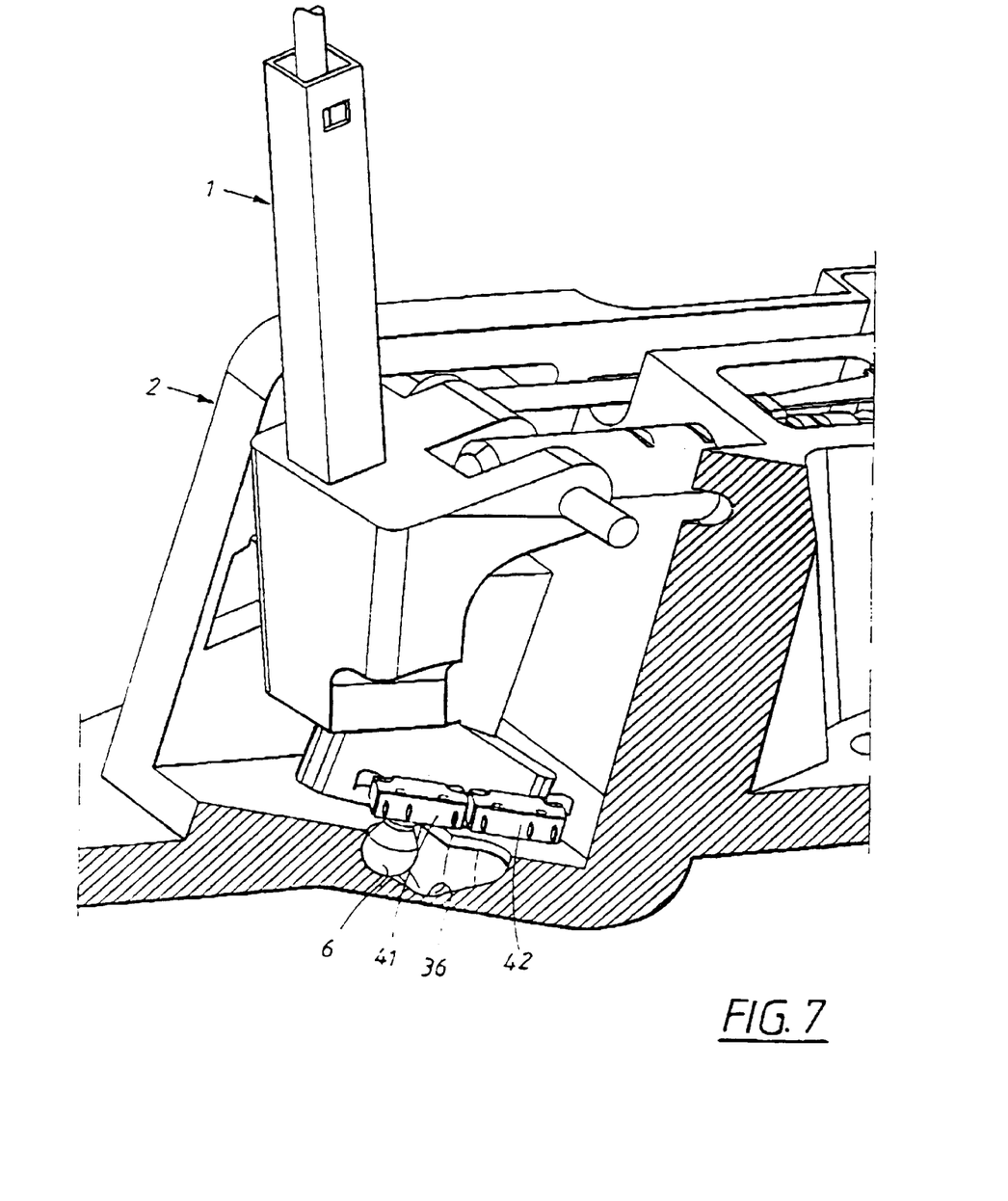
Figures 13A, 13B, 13C:
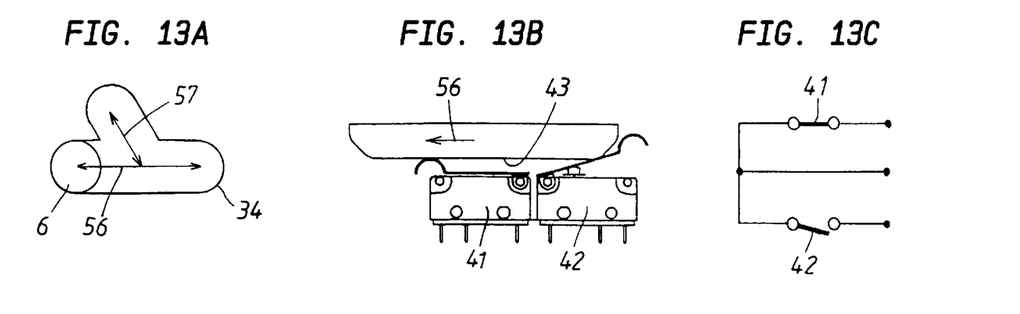
FIGS. 13A–13C show two switches forming part of the control device and assuming a different operating position.

FIG. 13 shows the hinge ball 6 being displaced in the direction of the arrow 56 to a position for changing up, see also FIGS. 7 and 9. In this regard, the control lever 1 is in the + position, see FIG. 9, and the guiding surface 43 on the lower end of the control lever is longitudinally displaced so that the microswitch 41 is switched to the closed condition and the switch 42 is opened.

The invention is not limited to the above-mentioned embodiments shown in the drawings, but may be varied within the scope of the appended claims. For example, the guide element 9 can have a cornered cross-section and may be adapted only for reciprocal axial movement. The sidewards pivoting displacement of the control lever 1 can be carried out so that the control lever 1 is rotatable in relation to the guide element 9 about its longitudinal axis 13 by means of a pivoting hinge. As is shown in FIG. 1, the transmission element in the form of a cable can be replaced by an electric sensor 3' which detects the forwards/backwards pivoting position of the lever and which transmits information to the gearbox in an electrical manner. The position sensors in the form of for example the microswitches 41, 42 can be positioned at some other position than at the lower end so as to detect the control movement of the lever 1.

Although the invention herein has been described with reference to particular embodiments, it needs to be understood that these embodiments are merely illustrative of the principles and applications of the present invention. It is therefore to be understood that numerous modifications may be made to the illustrative embodiments and that other arrangements have been devised without departing from the spirit and scope of the present invention as defined by the appended claims.

What is claimed is:

1. A control device comprising a control lever, a control bracket having a guide track, the control lever having a first pivotable hinge wherein the control lever is pivotally arranged in relationship to the control bracket for displacement between a plurality of control positions with a first control movement, wherein the control positions of the control lever about the first pivotable hinge are adapted to be transferred into corresponding operating conditions, the control lever further adapted to carry out a second control movement by turning the control lever about a second pivotable hinge forming a pivot center, a locking device which during displacement of said control lever to said second control movement locks the pivotable movement of the control lever about said first pivot hinge and changes the pivot center for the control lever to said second pivotable hinge, said second pivotable hinge including a transverse shaft which is translationally moveable in the guide track for determining the control movement of the control lever and for locking the translational displacement of the shaft in a predetermined control condition whereby the change of the pivot center for the control lever is carried out, the control bracket including a housing having two wall sections extending on each side of the control lever and having said guide track in each wall section, and a mechanical transmission element for the transfer of at least one operating condition operatively coupled to the control lever.

2. The control device according to claim 1, further including a bearing ball at the end of the control lever, and a bearing cup arranged in the control bracket to form part of the first pivotable hinge, said bearing cup allowing the displacement of the control lever to the second control movement about the second pivotable hinge by positionally guiding the movement of the bearing ball within the bearing cup.

3. The control device according to claim 2, wherein the bearing cup is in the form of tracks which allow both a rotational movement and a translational displacement of the bearing ball.

4. The control device according to, claim 3, wherein said tracks for said bearing ball comprise a first section for rotational movement of the bearing ball in a predetermined position for pivoting of the control lever about the first pivotable hinge, for translational displacement to a second section which presents an angle in relationship to the first section, and for translational displacement of the bearing ball along said second section for pivoting the control lever about the second pivotable hinge.

5. The control device according to claim 4, further including two electrical switches for detection of at least four positions of the control lever.

6. The control device according to claim 5, wherein the electrical switches are each adapted to maintain their respective electrical circuits broken with the bearing ball being in its position for rotational displacement in said first section; and maintaining both of the electrical circuits closed when in a first of three positions in the second section; maintaining one of the electrical circuits closed when in a second of the three positions in the second section, and maintaining the other of the electrical circuits closed when in a thrid of the three positions in the second section.

7. The control device according to claim 3, wherein said tracks for said bearing ball are generally T-shaped.

8. The control device according to claim 1, wherein during said second control movement, the control lever is adapted to be displaced along a path which extends in a direction which is separated from a direction which is parallel to a path of the first control movement.

9. The control device according to claim 8, wherein an angle between the two paths is in the interval of about 30°–45°.

* * * * *

UNITED STATES PATENT AND TRADEMARK OFFICE
CERTIFICATE OF CORRECTION

PATENT NO. : 6,082,213
DATED : July 4, 2000
INVENTOR(S) : Skogward

It is certified that error appears in the above-indentified patent and that said Letters Patent is hereby corrected as shown below:

Col. 8, line 66, "the—position" should read --the – position--.

Col. 9, line 38, "What is claimed is" should read --I CLAIM--.

Col. 10, line 42, "thrid" should read --third--.

Signed and Sealed this

Tenth Day of April, 2001

Attest:

NICHOLAS P. GODICI

Attesting Officer     Acting Director of the United States Patent and Trademark Office